April 9, 1968 S. O. SAMPSON 3,377,034

TAPE REEL FOR PARALLEL TRACKS TAPE RECORDERS

Original Filed Nov. 29, 1961

INVENTOR.
SIDNEY O. SAMPSON
BY
Zoltan Polachek
ATTORNEY

United States Patent Office 3,377,034

Patented Apr. 9, 1968

3,377,034

TAPE REEL FOR PARALLEL TRACKS TAPE RECORDERS

Sidney O. Sampson, Box 3261, Grand Central Station, New York, N.Y. 10017

Substituted for abandoned application Ser. No. 155,738, Nov. 29, 1961. This application Jan. 7, 1966, Ser. No. 536,476

2 Claims. (Cl. 242—74)

ABSTRACT OF THE DISCLOSURE

A tape reel having a segment removed from the hub and discs of the reel forming unobstructed recesses therein and a plurality of pegs including a centrally located peg, associated with the hub of the reel whereby a tape loop may be dropped over the centrally located peg to catch the tape loop.

Certain portions of the original disclosure of my prior application Ser. No. 155,738 have been cancelled as not essential for understanding of the invention of the reel per se in the present application.

This invention concerns a novel improvement in tape reel construction, adaptable for a variety of new uses. The present invention's utility features are included as featured parts in my copending applications (1) Automatic Tape Cartridge for Magnetic Tape, Ser. No. 364,-877, filed Apr. 17, 1964, now Patent No. 3,305,188; (2) Stereo Tape Control Apparatus for a Slide Projector, Ser. No. 380,976, filed June 24, 1964, now Patent No. 3,233,512; (3) Technological Modernization of Education, Ser. No. 510,449, filed Nov. 22, 1965, now abandoned.

The principal object is to provide an improved tape reel to simplify threading of recording tapes thereto for example, a particular obstruction to threading the tape on a tape reel is caused in the prior art, such as disclosed by Patent No. 2,974,892, where the length of tape loop leader to be attached to the takeup reel invented therein is handicapped by necessity to squeeze the tape loop of the leader tape inbetween the obstructive pair of respective narrow inlets which are disclosed connected to respective recess flanges formed on the diametrically opposed discs of the patented reel before the tape can be attached thereon; such attachments for a tape loop are shown in the various tape reel patents of the prior art utilizing means of only a single peg operatively located in the hub of the reel; thus the novelty of the tape reel threading means disclosed in the present tape reel invention is to eliminate the present handicap of the obstructive pair of such narrow inlets by the cooperative combination means disclosed below of respective substantially separated longitudinal flanges respectively connected to wide recess flanges respectively formed at diametrically opposed positions in the hub of the reel and respectively connected to respective projection means of this invention; these cooperative connections make novel tape loop "drop in" tape threading means; whereby is created an unobstructed access to the centrally located peg of the respective operating projection means formed on the inner faces of the discs of the present tape reel invention to catch a tape loop of the tape leader without there being any need to employ the obstructive pair of narrow inlets presently utilized by the prior art.

For further comprehension of the invention, and of the objects and advantages thereof, reference will be had to the following description and accompanying drawings, and to the appended claims in which the various novel features of the invention are more particularly set forth.

Figure 1:
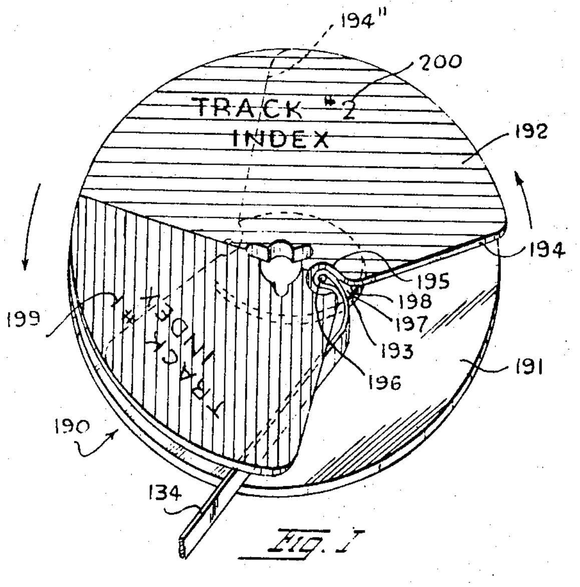
FIG. 1 is a perspective view of a tape reel adapted for use with the present invention.
Figure 2:
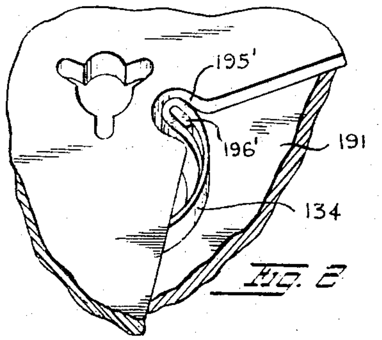
FIG. 2 is a perspective view of a modification of part of the tape reel of FIG. 1.
Figure 3:
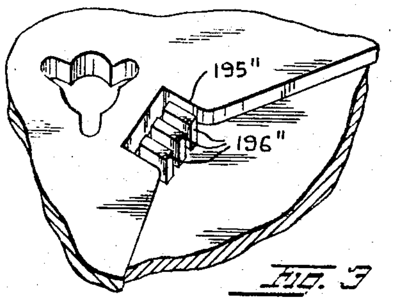
FIG. 3 is another perspective view of a further modification of part of the tape reel of FIG. 1 relative to FIG. 2.

FIG. 1 shows a novel type of reel which can be used for supply and takeup reels. Reel 190 has a bottom side constituted by a circular disc 191 joined to a similar top side constituted by a disc 192 by means of a cylindrical core 193. Disc 192 has a wide angular V-shaped cutout or missing segment 194. Peg 196 can be formed into various sizes and shapes to cooperate with recess 195. Recess 195 can also be of various sizes and shapes insofar that peg 196 and looped end 198 of tape 134 retain cooperative means to perform the function of tape drive and further shown by the illustrated modifications in FIG. 2 and FIG. 3. Whichever means recess 195, peg 196 and loop end 198 cooperate together to catch the tape for drive in the recorder, the novel feature of the tape reel as included in the present invention consists of the easy access to thread loop end 198 onto reel 190. This easy access is provided by the utility of top side missing segment 194. Modifications of projections means to catch a loop end 198 are shown in FIG. 2 and FIG. 3. FIG. 2 shows tape 134 looped on rectangular peg 196'. Peg 196' is also shown in this diagram 2 as disposed at the 196' is also shown in this diagram 2 as disposed at the center of the opening of recess 195'. FIG. 3 shows a plurality of pegs 196'' to be utilized in similar function to that of FIG. 2. Any one of pegs 196'' cooperative with recess 195'' can be utilized to catch loop end 198 for tape drive. Cylindrical core 193 is the hub support for discs 191, 192. It will be understood that the cylindrical core 193 otherwise called hub can be constructed in numerous other known ways, one of which ways comprises a plurality of circumferentially disposed spaced peg-projections on the inward face of the topside. The bottom disc will have cooperative projection means disposed on its inward face, preferably shown by FIG. 3 and FIG. 4, and will be then locked together to form a complete tape reel having a missing segment on the topside according to the present invention, thus, the circumferentially spaced pegs provide the same utility as that made by said cylindrical core and therefore this type of hub will be designated to also be equivalent to a cylindrical core, according to the invention.

The size of the opening on top side disc caused by missing segment 194 and the novel utility provided thereby, should preferably be of sufficient width at the rim of top-side disc 192 to accommodate normal easy handling of tape 134 to catch on any of the above described projection means. This width, of course, will necessarily vary with the many different sizes of tape reels; however, it must be substantially larger for its utility purposes over keyhole size. It will be understood that although the preferred embodiment of the feature parts of my novel tape reel invention is described for a missing segment on only one side of the tape reel, the invention can be utilized for a missing segment to be suitably disposed on the bottom side of disc 191 for use in dual track flip-over tape recorders. Missing segment 194 provides a window in disc 192 for visual indication of the amount of tape on the reel 190. Lines 194'' shows dual utility of side 191.

The utility cutout is formed with an apical portion

195. Coaxial with the apical recess 195 is a peg 196 formed at the inner end of a radial slot 197 in the core 193. The looped end 198 of a tape 134 can be easily engaged to "catch" on this peg for winding the leading or trailing end of the tape thereon. The simplified arrangement is especially adapted for use by children and others who might have difficulty in threading tapes between the rim flanges on other prior known types of reels. This difficulty is caused by the present need in all other types of known reels of whatever description of the operator having to distressingly squeeze the loop end 198 between narrow flanges as disposed without the missing segment of the present invention's tape reel convenience. Thus, my invention overcomes any need to squeeze in the tape under the top disc for its tape drive.

Disc 192 is divided into two sections, one section being indicated at 199 and constituting the track #1 index and the other section being indicated at 200 and constituting the track #2 index. This novel indexing arrangement is particularly adaptable for uses in my "parallel" tracks tape recorder. In the present invention, for example, both of utility track arrangements of track #1 and track #2 indexes can be visually utilized for pencilling utility of respective track notations without any of the present necessity in other tape reel labelling systems which require the operator to flip-over known tape reels to accomplish the same result in dual track tape recorder operations. The sections may also be colored with contrasting colors, for example, section 199 may be colored red and section 200 may be colored blue. Sections 199 and 200 are preferably of solid construction for both discs 191 and 192 to best accommodate utility of writing on the surface of disc 192 as correlated with track indexes #1 and #2. This designation of tracks is an improvement over the conventional designation of sides of reels. It is preferred that sections 199 and 200 be suitably rough-finished or chemically treated to accommodate utility of pencilling notations respectively on indexes #1 and #2. My novel reel can be utilized for movie films and ribbons.

Figure 5:
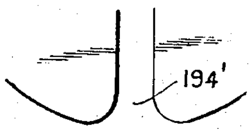
FIG. 5 is a diagram of a modification of the V shaped missing segment shown in FIG. 1.

FIG. 5 shows an elongated missing segment 194' with straight sides. This equivalent modification should be wide enough to provide for holding the looped end 198 of tape 134 between the thumb and forefinger, thus to easily place the pinched loop of the tape around the projection means to catch it thereon for drive. Modified segment 194' as shown conformed would best end at modified aperture recesses 195'' shown by FIGS. No. 3 and 4. Therefore, my novel missing segment provides new utility of a visual perspectively converging guide to the tape-catching projection means for naturally instinctive top-of-reel thumb and forefinger handling of said end of tape when forming a loop of the tape at that position and therewith applying it for simple unobstructed "drop in" over said projection means without the present difficulty of having to first squeeze said end of tape between narrow slot-flanges or rim-flanges which in known tape reels are in one form or the other presently obstructive to tape reel threading.

In view of the above description of my featured means for tape reel drop in threading, it will be understood that any known tape reel construction whether of plastic or metal fabrication can be adapted to contain the novel features of this invention.

To fully understand the preferred constructional embodiment of the instant invention, please note that FIGS. 1, 2, 3 and 4 showing hub recesses 195, 195' and 195'' respectively, are minus any narrow, obstructive, restricted inlet flanges; said restricted inlet flanges are utilized in known tape reels. In the instant invention, for example, the substantially separated longitudinal edge flanges comprising the construction of the respective missing segment 194 of the respective topside disc 192, are unobstructively connected, directly, with the wide-width slot which partly forms the flanges of the respective recess

Figure 4:
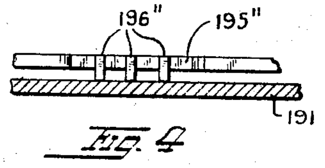
FIG. 4 is a fragmentary front elevational view of FIG. 3.

195, thus the invention eliminates said restrictive inlet flanges while an unobstructed area is shown provided for tape loop "drop in," unobstructively over the peg 196 shown located on the inner side of bottom disc 191, which peg, of course, may otherwise be any other one peg of the other projection means shown respectively in FIGS. 2, 3, and 4. It will therefore be seen from the drawings, that a loop of tape can be held inbetween said substantially separated longitudinal edge flanges which have a minimum width allowing for the approximate measurement of a child's thumb and forefinger as holding the tape loop, and thereafter the loop of the tape is simply dropped over the respectively utilized projection means to catch the tape, and then the long end of the tape loop will frictionally bind itself over the short end of the tape loop and then be automatically held against the cylindrical core of the hub, thus accomplishing simplified tape reel threading means of the invention over the known threading means in the art.

While I have illustrated and described the preferred embodiments of my invention, it is to be understood that I do not limit myself to the precise constructions herein disclosed and that various changes and modifications may be made within the scope of the invention as defined in the appended claims.

I claim:

1. A tape reel comprising the combination of a cylindrical hub supporting a pair of opposing discs, each of said discs having a single missing segment forming substantially separated longitudinal flanges respectively disposed at diametrically opposed positions in said tape reel, said longitudinal flanges being respectively connected to respective wide recess flanges respectively disposed at diametrically opposed positions in said hub, and projection means including a plurality of peg projections and having a centrally located peg thereof to catch a tape loop, said projection means being formed at diametrically opposed positions on the inward faces of said discs and being cooperative in said hub with respective recess flanges, whereby said combination provides an unobstructed operational area for receiving a tape loop when the tape loop is held inbetween respective longitudinal flanges and respective recess flanges and then dropped over the centrally located peg of respective projection means to catch the loop.

2. A tape reel comprising the combination of a cylindrical hub supporting a pair of opposing discs, only one of said discs having a single missing segment forming substantially separated longitudinal flanges in said one disc, said longitudinal flanges being connected to wide recess flanges disposed in said hub, and projection means including a plurality of peg projections and having a centrally located peg thereof to catch a tape loop, said projection means being formed on the inward face of the other disc and being cooperative in said hub with said recess flanges, whereby said combination provides an unobstructed operational area for receiving a tape loop when the tape loop is held inbetween said longitudinal flanges and said recess flanges and then dropped over the centrally located peg of said projection means to catch the loop.

References Cited

UNITED STATES PATENTS

| | | | |
|---|---|---|---|
| 2,189,547 | 2/1940 | Fischer | 242—71.8 |
| 2,600,409 | 6/1952 | Lippert | 242—71.8 |
| 2,954,941 | 10/1960 | Hultgren | 242—74 |
| 3,064,917 | 11/1962 | Roberts et al. | 242—71.8 |
| 3,087,593 | 4/1963 | Kloski | 242—74 X |

FOREIGN PATENTS

| | | |
|---|---|---|
| 1,324,300 | 3/1963 | France. |
| 1,333,915 | 6/1963 | France. |

STANLEY N. GILREATH, *Primary Examiner.*